United States Patent
Tangen

(10) Patent No.: US 10,505,586 B2
(45) Date of Patent: Dec. 10, 2019

(54) NFC METHOD AND DEVICE ENABLING POWER SAVE MODE DURING NFC CONNECTED MODE FOR COMMUNICATION WITH IMPROVED POWER HARVESTING

(71) Applicant: ONE2TOUCH AS, Oslo (NO)

(72) Inventor: Kyrre Tangen, Fredrikstad (NO)

(73) Assignee: ONE2TOUCH AS, Oslo (NO)

( * ) Notice: Subject to any disclaimer, the term of this patent is extended or adjusted under 35 U.S.C. 154(b) by 38 days.

(21) Appl. No.: 15/533,108

(22) PCT Filed: Dec. 4, 2015

(86) PCT No.: PCT/NO2015/050238
§ 371 (c)(1),
(2) Date: Jun. 5, 2017

(87) PCT Pub. No.: WO2016/144184
PCT Pub. Date: Sep. 15, 2016

(65) Prior Publication Data
US 2017/0331522 A1    Nov. 16, 2017

(30) Foreign Application Priority Data

Dec. 4, 2014  (NO) .................................. 20141467

(51) Int. Cl.
| | |
|---|---|
| *H04B 5/00* | (2006.01) |
| *H04W 4/80* | (2018.01) |
| *H04W 4/00* | (2018.01) |
| *H04W 52/02* | (2009.01) |
| *H04W 24/02* | (2009.01) |
| *H02J 7/02* | (2016.01) |
| *H02J 50/10* | (2016.01) |

(Continued)

(52) U.S. Cl.
CPC ............ *H04B 5/0031* (2013.01); *H02J 7/025* (2013.01); *H02J 50/00* (2016.02); *H02J 50/10* (2016.02); *H04B 5/0037* (2013.01); *H04W 4/00* (2013.01); *H04W 4/80* (2018.02); *H04W 24/02* (2013.01); *H04W 52/02* (2013.01); *H04W 52/0229* (2013.01); *H04W 52/0277* (2013.01); *H02J 2007/0096* (2013.01); *Y02D 70/00* (2018.01)

(58) Field of Classification Search
None
See application file for complete search history.

(56) References Cited

U.S. PATENT DOCUMENTS

| | | |
|---|---|---|
| 2009/0196209 A1 | 8/2009 | Haartsen |
| 2010/0130127 A1 | 5/2010 | Takayama |

(Continued)

FOREIGN PATENT DOCUMENTS

| | | |
|---|---|---|
| EP | 2541995 A1 | 1/2013 |
| WO | 2006/095186 A1 | 9/2006 |

OTHER PUBLICATIONS

International Search Report PCT/NO2015/050238 dated Aug. 3, 2016.

*Primary Examiner* — Alejandro Rivero
(74) *Attorney, Agent, or Firm* — McDermott Will & Emery LLP

(57) ABSTRACT

Method and devices for enabling Power Save Mode (PSM) in near field communication (NFC) between a first active NFC device and a second NFC device, when the first active NFC device and the second NFC device are in NFC connected mode.

15 Claims, 7 Drawing Sheets

(51) Int. Cl.
*H02J 50/00* (2016.01)
*H02J 7/00* (2006.01)

(56) References Cited

U.S. PATENT DOCUMENTS

| | | |
|---|---|---|
| 2011/0127951 A1* | 6/2011 | Walley .................... H02J 7/025 320/108 |
| 2013/0084803 A1 | 4/2013 | Hall et al. |
| 2013/0281013 A1 | 10/2013 | Hillan |

* cited by examiner

NFC METHOD AND DEVICE ENABLING POWER SAVE MODE DURING NFC CONNECTED MODE FOR COMMUNICATION WITH IMPROVED POWER HARVESTING

CROSS-REFERENCE TO RELATED APPLICATIONS

This application is the U.S. National Phase of PCT/NO2015/050238 filed Dec. 4, 2015, which claims priority to Norwegian Patent Application No. 20141467 filed Dec. 4, 2014. The subject matter of each is incorporated herein by reference in entirety.

TECHNICAL FIELD

The present invention relates generally Near Field Communication, NFC, between two parties. More specifically, the present invention relates to an improved method and system for controlling power harvesting, response time and data rate between two devices while saving power. Even more specifically, the present invention relates to an NFC connected mode, comprising initialization from an NFC not connected mode and thereafter periods of active data mode alternating with periods of lower average power in which the two devices remain in NFC connected mode.

BACKGROUND OF THE INVENTION

NFC is a very short range wireless communication system. It can transfer small amounts of data wireless between two devices that are a few centimeters from each other.

NFC is an extension of Radio Frequency IDentification (RFID) technology and allows two-way communication between two devices while basic RFID only allows one-way communication.

NFC is often directed to short information exchange between an active NFC device, e.g. a mobile phone and an accessory NFC device. The accessory NFC device may be a unit or tag that harvests its power from the active NFC device. Such information can be just identification of said unit or tag or it can be collecting information from the unit of tag. Identification of a unit can also be the first step in automated establishment of other communication means such as Bluetooth communication or Wi-Fi communication. Other uses of NFC is automated use of applications of many kinds such as enabling of applications in mobile phones, replacing credit cards, unlocking door locks etc. To perform such tasks, small chunks of information are transmitted in a short time.

NFC typically uses a frequency of 13.56 MHz for communicating. The corresponding wavelength is about 22 meters. The antennas of the active NFC device and the accessory NFC device are in fact not real antennas but rather electrical coils. Still we will call them antennas. This results in a very short communication range—in the area of 0 to about 4 centimeters. This also implies that some small amount of power can be transferred between the devices, normally from the active NFC device to the accessory NFC device. Then the accessory NFC device may harvest this power to perform its intended tasks without using any other power source.

Typically e.g. a mobile phone may set up an intermittent continuous NFC field in a state that we may call sniffer mode. In sniffer mode, the average current needed for this from the mobile phone is rather small, typically in the area of one mA. The sniffer mode is typically a repetitive short duration pulse train that is repeated at intervals of a few hundred milliseconds. An electromagnetic field then surrounds the mobile phone. When an accessory NFC device approaches the mobile phone acting as an active NFC device, the active NFC device detects that the impedance of its antenna changes and will start a procedure to investigate and connect the active and the accessory NFC devices.

When the two NFC devices are connected, data exchange mode is enabled. In data exchange mode, a short chunk of information is transferred one or both ways, the exchange mode is terminated, and sniffer mode is reinstated.

NFC-technology is based on standards including ISO 18092, ISO 21481, ECMA (340, 352 and 356) and ETSI TS 102 190. Furthermore, such NFC-technology is also compatible with contactless infrastructure for smartcards based on a standard ISO 14443 A, including Philips' MIFARE-technology and Sony's FeliCa-card.

One example in the art that presents harvesting of power from a second NFC device to a first NFC device is the Patent publication US 20140170976 A1 of Broadcom Corporation. This application uses the existing NFC technology as specified in the current standards.

Existing NFC enabled mobile telephones use often about 1 milliampere to the task of maintaining an NFC sniffer modus and about 200 milliampere when in data exchange mode. Because NFC usually is in data exchange mode for a relatively short period of time of less than one minute, this is not a considerable power consumption. On the other hand, if the data exchange mode is extended to more than one minute, ten minutes or even more than one hour, this is exhaustive power drawn from e.g. a mobile telephone running on internal batteries.

Existing NFC enabled mobile telephones use often about 1 milliampere to the task of Sniffer modus is used by mobile telephones more or less continuous in order to react to an approaching second NFC device. Mobile telephones are designed to be operable a long time between charging of its batteries and therefore the added power consumption in NFC sniffer modus is of particular importance. Much effort, including filing of a number of patent applications, has been done to minimize necessary power in this modus. Connected mode is normally just used just for a short time while transmitting a transaction act, e.g. transferring money or verifying an airplane ticket or allowing passing through a gate. Therefore an increased power consumption during such short times are normally not a problem for a mobile phone battery.

When data is transferred between two NFC devices, a transmitter enters the data on an NFC carrier wave by amplitude modulation.

The patent application US 2010130127 A1 of Sony describes a system prepared to turn off output of an electromagnetic wave for a given period of time. The turn off time is based on attribute information indicating communication ability. This turning off is due to a target of reducing power consumption e.g. in a cell phone. In connected mode, on the other hand, this application does not reveal reducing or turning off output of the magnetic wave in connected mode.

The patent application US 2009196209 A1 presents an implementation of a power savings mode in which a transmitting device sleeps after transmitting a first synchronization packet. Optionally also after transmitting a second synchronization packet.

An important aim of the present invention is not only to save power in a first NFC device, but to improve power harvesting, i.e. to make sure that a second active NFC device harvests sufficient power from the first NFC device to operate, even without the second NFC device necessarily comprising power supplied from conventional secondary or primary batteries. This invention does the power harvesting more reliably while at the same time consuming less power than present solutions do.

SUMMARY OF THE INVENTION

One preferred embodiment of the present invention is a method for near field communication (NFC) with improved power harvesting, the method enabling Power Save Mode (PSM) in NFC between a first active NFC device and a second NFC device, when the first active NFC device and the second NFC device are connected. The first active NFC device and the second NFC device entering PSM comprising a first initialization step and thereafter the first active NFC device and the second NFC device concurrently alternating between the following steps:

during a first time slot, called active data mode, data is exchanged between the first active NFC device and the second NFC device; and during a second time slot, called standby mode, the first active NFC device transmits a standby sequence of NFC waves having lower average power than in the data sequence in the first slot the NFC waves comprising at least one of: lower average field strength. The lower average may comprise substantially zero field strength; and non-continuous duration, while the first active NFC device and the second NFC device remain in NFC connected mode and the second NFC device harvesting sufficient power to remain in NFC connected mode.

Optionally for the method the first or the second NFC device comprising generating bursts of a keep alive carrier wave (KAC). KAC is transmitted from the first active NFC device and the KAC may be controlled by one or more of the following parameters: field strength of the KAC; duration of a KAC burst; and resting period before a KAC burst. With such bursts, it is possible for the second NFC device to harvest sufficient power to be kept alive all the time.

Optionally, required parameters for power harvesting are calculated in high level SW and afterwards transferred to a chipset for real time NFC operation.

Optionally, the method for enabling PSM where the second NFC device is an accessory NFC device.

Optionally, the method is controlled by e.g. an application program in the first active NFC device that recognizes that both the first active NFC device and the second NFC device accept transition from conventional connected mode to sub mode PSM.

Optionally, the method is controlled by e.g. a program in a chipset in the first active NFC device that recognizes that both the first active NFC device and the second NFC device accept and initiating PSM by transmitting a request to the second NFC device accept transition from conventional connected mode to sub mode PSM.

Optionally, the method is controlled by a program in the first active NFC device and initiating PSM by transmitting a request to the second NFC device if it accepts a transition from connected mode to sub mode PSM.

Optionally, the method is controlled by the second NFC device and the second NFC device initiates PSM by transmitting, in normal NFC connected mode, a request to the first active NFC device if it accepts a transition to sub mode PSM.

Optionally, the method where controlling the NFC field strength at least partly is based on requirements for at least one of: data rate; response time of the accessory NFC device; reduced power consumption in the first active NFC device; and power harvesting in the second NFC device.

Optionally, the method, where the first initialization step comprises actively changing an impedance of the antenna of the second NFC device, in order to emulate changing a distance between the first active NFC device and the second NFC device e.g. enabling more power for power harvesting in the second NFC device.

In another preferred embodiment, the present invention is an NFC device, adapted to implement the method for enabling PSM communication.

In yet another preferred embodiment, the present invention is a first active NFC device adapted, in connected mode, to control NFC field strength at least partly based on requirements for at least one of: data rate; response time of the second NFC device; reduced power consumption in the active NFC device; and power harvesting in the second NFC device.

In yet another preferred embodiment, the present invention is a first active NFC device adapted, in connected mode, to control bursts of keep alive carrier (KAC) at least partly based on requirements for at least one of: reduced power consumption in the active NFC device; and power harvesting in the second NFC device.

In still another preferred embodiment, the present invention is an accessory NFC device adapted, in connected mode, to control NFC field strength at least partly based on requirements for at least one of: data rate; response time of the accessory NFC device; and reduced power consumption in the first active NFC device; and power harvesting in the accessory NFC device.

In still another preferred embodiment, the present invention is an accessory NFC device adapted, in connected mode, to control bursts of keep alive carrier (KAC) at least partly based on requirements for at least one of: reduced power consumption in the first active NFC device; and power harvesting in the accessory NFC device.

DESCRIPTION OF THE DIAGRAMS

Embodiments of the invention will be described, by way of example only, with reference to the following diagrams wherein.

REFERENCE SIGNS

| | |
|---|---|
| 10 | Active NFC device |
| 11 | NFC interface |
| 12 | Antenna of active NFC device |
| 20 | Second NFC device |
| 22 | Antenna of second NFC device |
| 100 | NFC polling pulse |
| 110 | NFC data exchange |
| 200 | Power Save Mode (PSM) |
| 210 | Active data mode |
| 220 | Standby mode |
| 300 | NFC not connected mode |
| 310 | NFC connected mode |

DETAILED DESCRIPTION OF THE INVENTION

Figure 1:
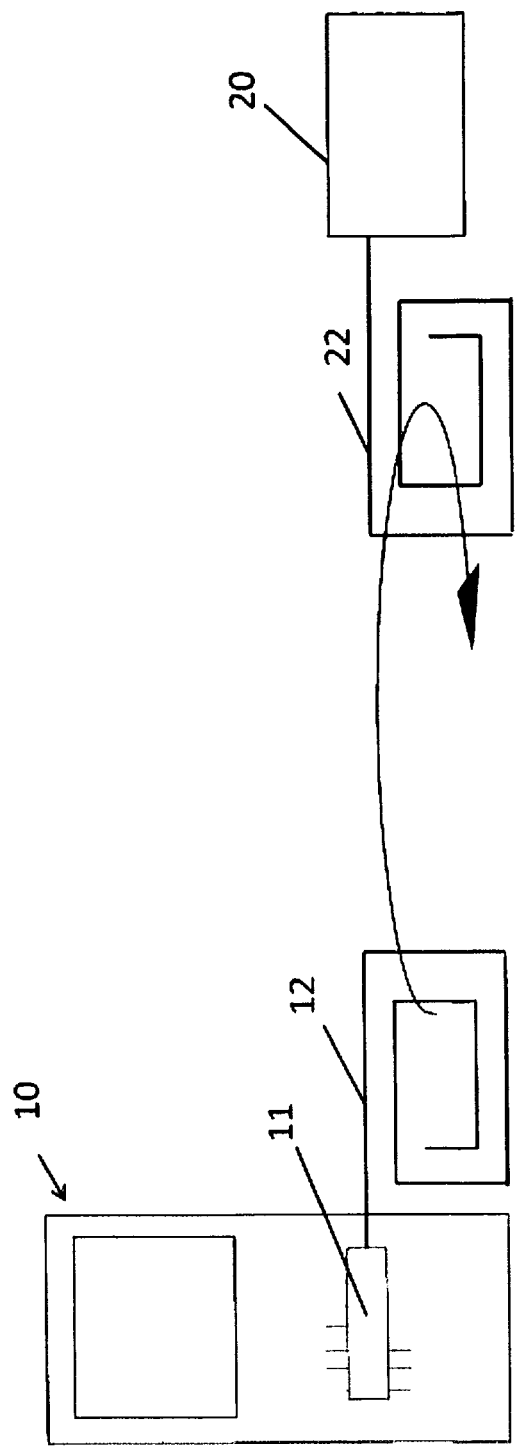
FIG. 1 is an illustration of communication between an active NFC device and a second NFC device.
Figure 2:
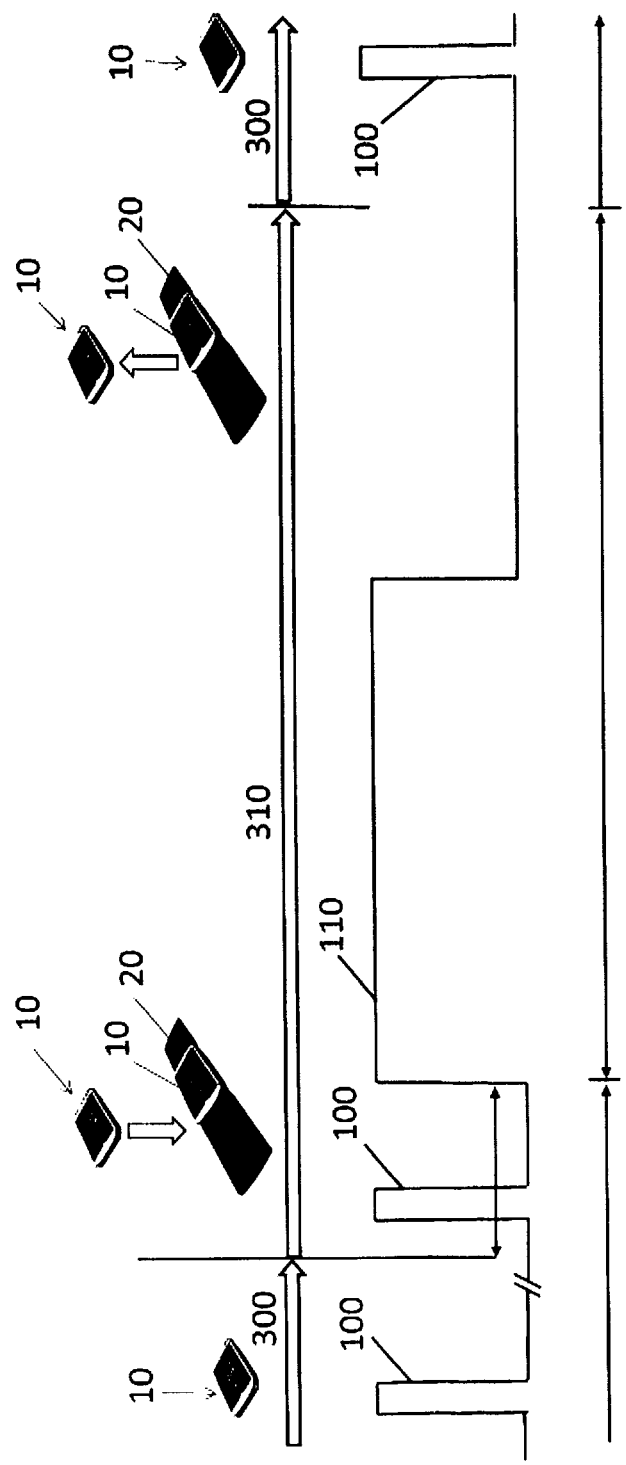
FIG. 2 is an illustration of a time sequence of an example with conventional NFC communication between a first active NFC device and a second NFC device.

Embodiments of the invention will now be described, with reference to the drawings. FIG. 1 illustrates NFC communication with an active NFC device 10 with a related antenna 12 and a second NFC device 20 with a related antenna 22. The arrow indicates a magnetic field connecting the two antennas 12, 22. The antennas 12, 22 are normally integrated in the respective NFC devices 10, 20, but are presented as external elements in FIG. 1 for clarity.

Initially during normal NFC communication, an active NFC device 10 will transmit an NFC polling pulse 100 which is a short burst of carrier frequency signals with a pause before a new polling pulse 100 is transmitted. This continues until a second NFC device 10, 20 is moved from a position e.g. 50 centimeters away to a closer position within a distance of less than 10 centimeters from an active NFC device 10. Normal NFC operation is that the active NFC device 10 then detects an alteration of the impedance of its antenna 12 and initiates a sequence to wake up both NFC devices. There will often be a latency period resulting in data exchange 110 not starting immediately after the second NFC device 10, 20 is in the proximity of the active NFC device 10. A normal NFC communication will then be to transfer a chunk of data between the two NFC devices and afterwards to terminate exchanging of data. It would be possible to maintain the phase of data exchange 110 but then some dummy signals have to be exchanged to ensure the data channel not to terminate. This results in the power consumption being higher than necessary.

Figure 3:
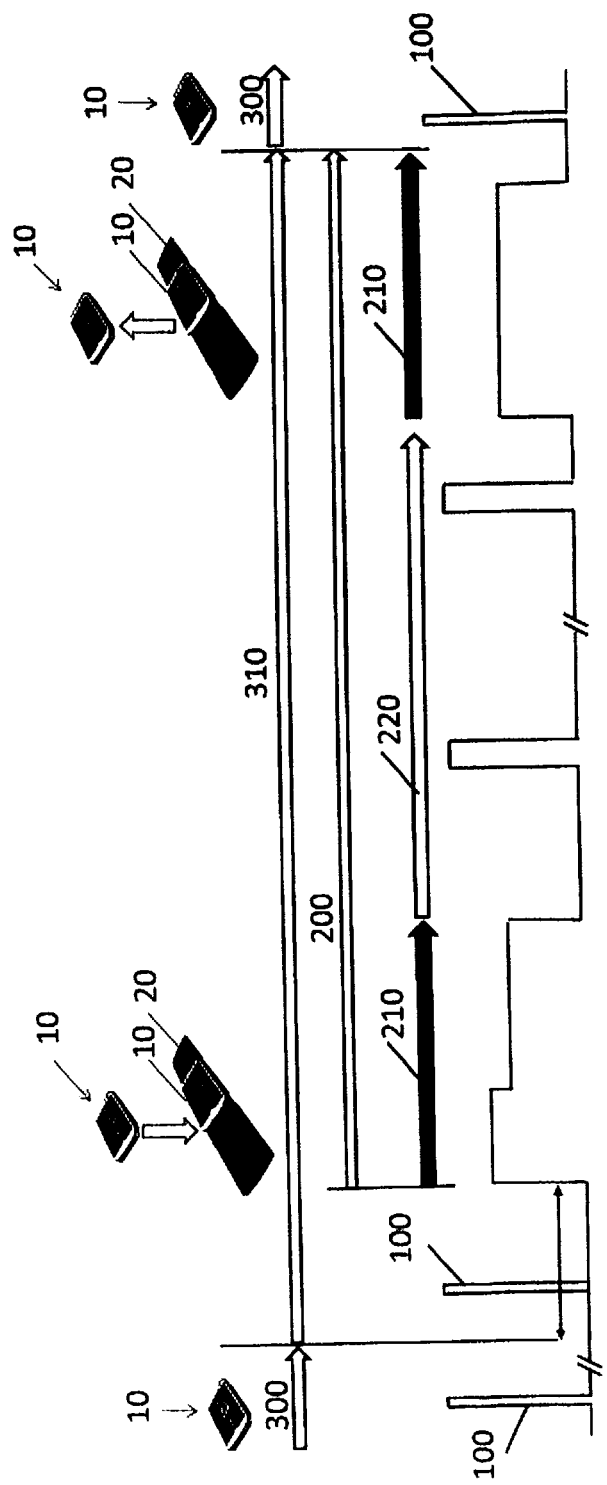
FIG. 3 is an illustration of a time sequence of an example with NFC communication between an active NFC device and a second NFC device with Power Save Mode (PSM) according to the present invention.

Turning now to FIG. 3, the present invention introduces a Power Save Mode (PSM) 200 which is a mode that is a sub mode of the normal NFC connected mode 310. An initialization step of the present invention of enabling PSM 200 may comprise actively changing the impedance of the antenna of the second NFC device 10, 20. By doing this in a way that emulates the first active NFC device 10 and the second NFC device 10, 20 approaching each other, the first active NFC device 10 can be tempted to power up for NFC communication, regardless of physically letting said NFC devices 10, 20 approaching each other, but staying close enough to enable NFC communication. The speed in powering up can be increased, particularly if the second NFC device 10, 20 can operate more efficiently with added power from power harvesting.

Such an approach can be utilized not only for initiating normal NFC communication. This could again be used for different uses like charging batteries or for powering different kinds of equipment or systems. Special purpose NFC communication can also be emulated for the same purpose.

When the active NFC device 10 and the second NFC device 10, 20 enters data exchange mode 110, according to the present invention, the two NFC devices 10, 20 may negotiate if both accept PSM 200 and then enter PSM 200. If one of the two NFC devices 10, 20 does not recognize or accept PSM 200, the communication remains in the mode of normal NFC data exchange 110. On the other hand, if both NFC devices 10, 20 accept PSM 200, PSM 200 is entered as a subset of the mode of normal NFC data exchange 110.

PSM 200 introduces two sub modes which is a form of time division between two time slots, 210, 220.

The first sub slot of PSM 200 is an active data mode 210. When in this mode, data is transferred between the two NFC devices 10, 20.

The second sub slot of PSM 200 is a standby mode 220. When in this mode, no actual data is transferred, but different options are foreseen for the operation in standby mode in order to control required use of power in the active NFC device 10, data rate and power harvesting in the second NFC device 10, 20.

Power, data rate and power harvesting can be controlled from the active NFC device 10, from the second NFC device 10, 20 when in connected mode 310 or from an application program in the active NFC device 10. Control can be performed by hardware, firmware, software or a combination of these.

The control can be done comprising identification of the need for power, data rate, power harvesting and other factors such as stability of received signals.

During the process of controlling, a first active NFC device 10 and a second NFC device 10, 20 may communicate information between each other that may be desirable for optimizing control such as the second NFC device 10, 20 requesting more power.

One option for operating the standby mode 220 is to use NFC field pulses not necessarily containing data for communication but comprise power to maintain PSM 200 between sequences of active data mode 210. The amplitude of the NFC field and the duration of the pulses or waves as well as the duration and time of pause between the pulses or waves are available elements for the controlling of these pulses. The pulses or waves in standby mode 220 may have lower average field strength than in active data mode 210 or may consist of bursts of NFC carrier waves in a fraction of the time of one standby mode slot.

Optionally, the duration of the active data mode 210 and the duration of the standby mode 220 may be a fixed multiplexing scheme set up in an initial phase based upon the requirements of an application.

Optionally, the construction of the standby mode may be fixed at an initial phase based upon the application.

Returning now to the active data mode 210, the NFC field can be controlled similar to the ways that has been described for standby mode. E.g. if the power of the NFC field is higher than necessary, it can be reduced in magnitude or duration in order to save power.

When, as described previously, a second NFC device 10, 20 is moved closer to and within a distance of less than 10 centimeters from an active NFC device 10, the NFC connected mode 310 is defined as starting when one of the active NFC device 10 and the second NFC device 10, 20 start detecting the other one. According to the present invention, the impedance of the accessory device can then be changed actively in order to invite the active NFC device 10 to increase its NFC power, by increasing the magnitude of the field or the duration of the pulses, in order to prepare for the second NFC device 10, 20 to harvest more power in this startup phase of the connected mode.

Entering PSM 200 can be done from different initiators, from the active NFC device 10 or from the second NFC device 10, 20. If entered from the active NFC device 10, it can be initiated from an NFC chip driver or from an application of the active NFC device 10. If initiated by the second NFC device 10, 20, the second NFC device 10, 20 must transmit control information to the active NFC device 10 because the active NFC device 10 directly controls the NFC field. If initiated from the active NFC device 10, control information from the second NFC device 10, 20 can be transmitted from the second NFC device 10, 20 or offline information about the second NFC device 10, 20 can be used instead if control information is not transmitted from the second NFC device 10, 20.

Figure 4:
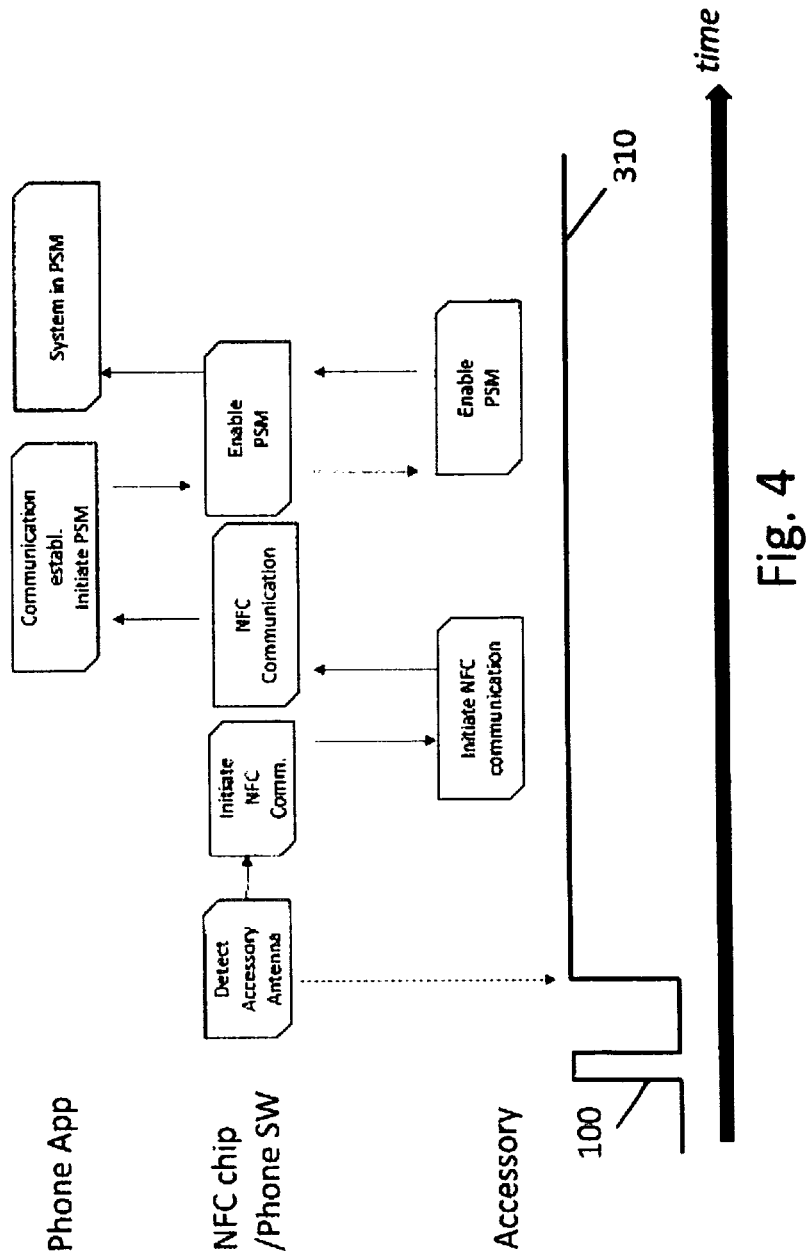
FIG. 4 is a simplified state diagram illustrating an algorithm how PSM can be entered, initiated from an application program in an active NFC device.

FIG. 4 illustrates an embodiment where active data mode 210 is entered from a telephone.

An NFC chip 11 and/or software (SW) is integrated in an active NFC device 10, e.g. a mobile phone. This SW can be a SW driver in the phone or firmware related to a chip that operates NFC for the active NFC device 10. A person in the art will understand that such a chip may be separate integrated circuit or integrated otherwise with the active NFC device 10.

In FIG. 4 is indicated that the NFC chip detects a presence of an accessory antenna, initiates NFC connected mode 310 and reports this to a phone application. The phone application then requests if PSM 200 is available for this NFC communication session. This request is accepted by the second NFC device 10, 20 by enabling PSM 200.

PSM 200 is initiated when in NFC connected mode 310 and both the active NFC device 10 and the second NFC device 10, 20 may be compatible with other devices that are not adapted to go into PSM 200.

Figure 5:
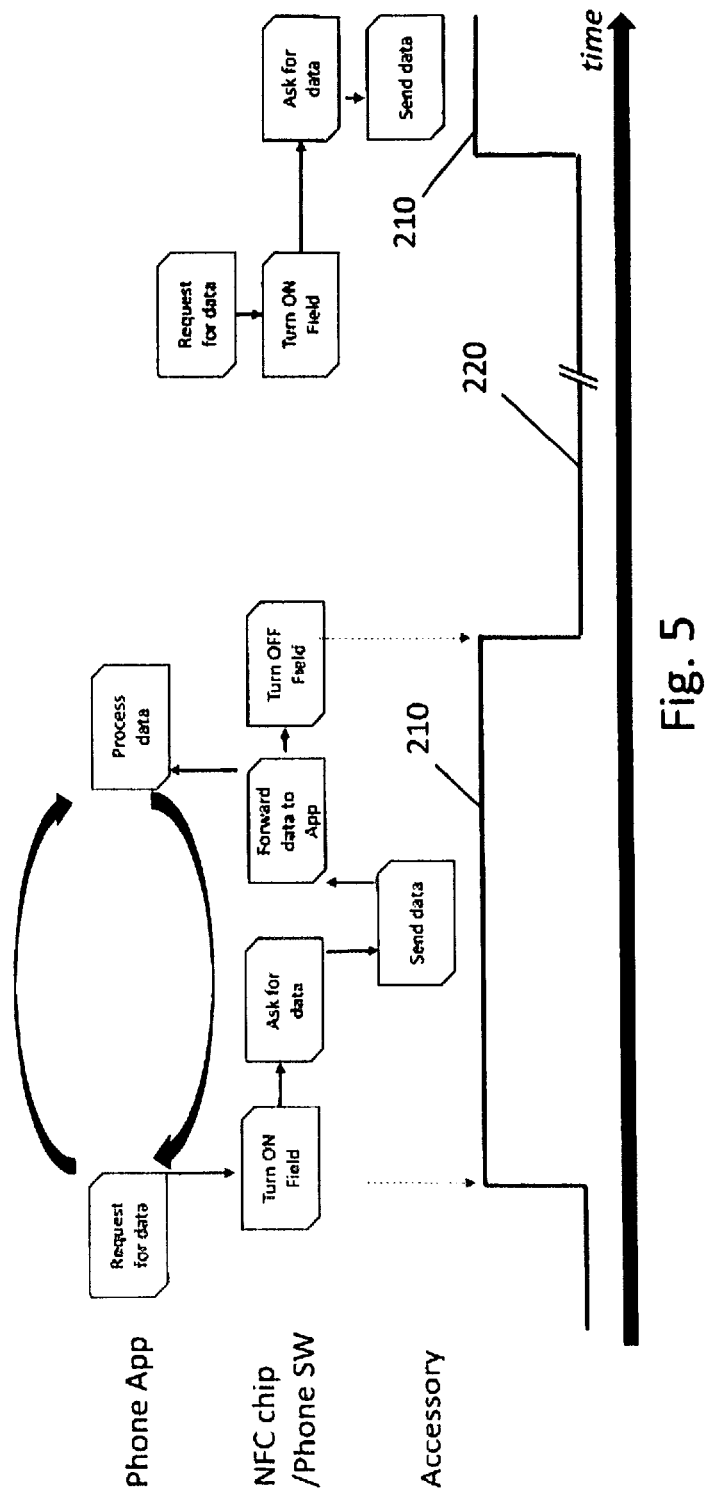
FIG. 5 is a simplified state diagram illustrating an algorithm for how Power Save Mode (PSM) can be controlled by an application program in an active NFC device.

FIG. 5 illustrates an embodiment where an application in the active NFC device 10, e.g. a mobile phone application, controls the PSM 200. This application initiates active data mode 210, e.g. turns an NFC field on when a request for data is to be transmitted from the mobile phone 10, and the second NFC device 10, 20 responds by sending the requested data. This is repeated as long as there are data be transmitted, indicated in FIG. 5 by the curved arrows. After all the requested data is received by the phone app in phone 10, the NFC field is returned to standby mode 220, e.g. turned off. In standby mode 220, the NFC system is waiting for data to be transferred.

Depending on the application, the time period in active data mode 210 and the time in standby mode 220 can be based on a time division multiplex scheme. The time division can be defined time slots controlled by an application, the active NFC device 10 or the second NFC device 10, 20. These time slots can be fixed initially or be dynamically adjusted. If the second NFC device 10, 20 controls the time slots, control information must be transmitted from the second NFC device 10, 20 to the active NFC device 10.

During active mode 210 and standby mode 220, both the strength of the NFC field and the duration of NFC field contributes to a tradeoff between need for power harvesting in the second NFC device 10, 20, response time and power consumption in the active NFC device 10.

Figure 6:
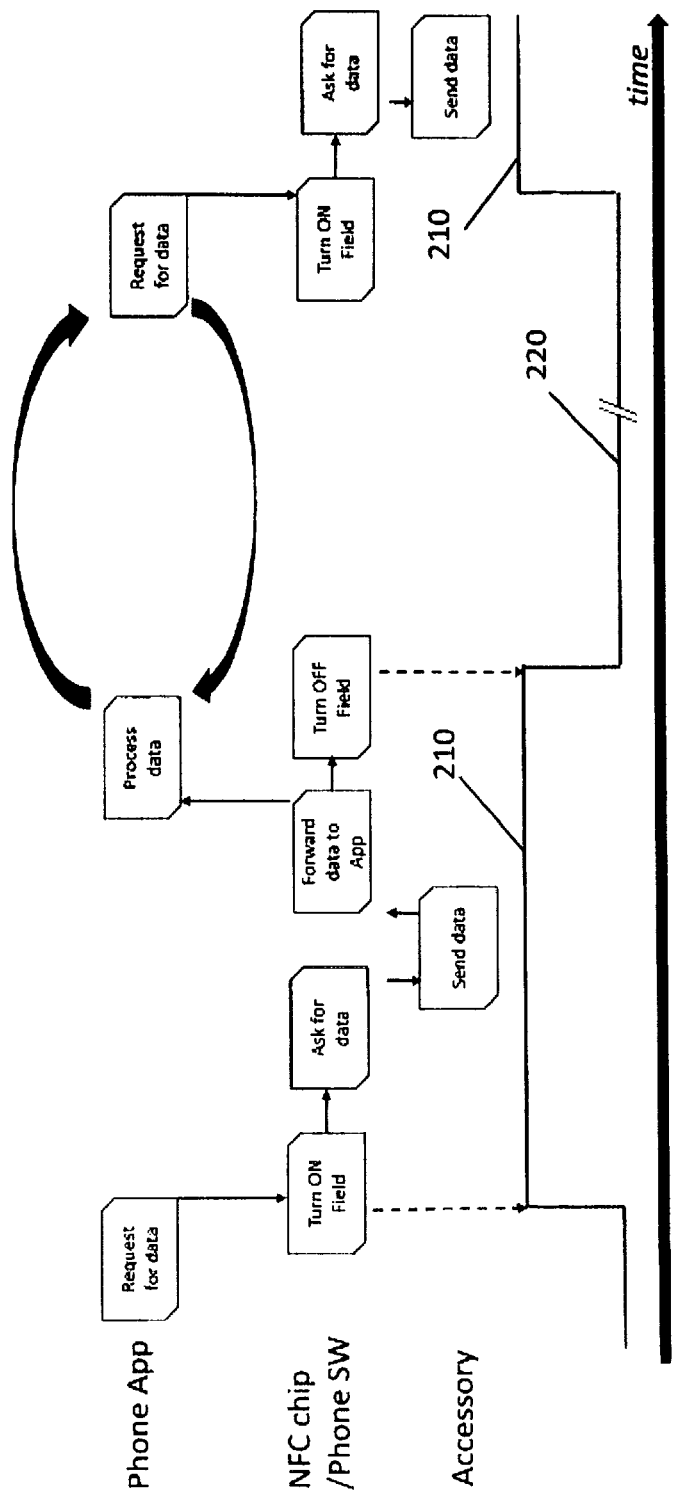
FIG. 6 is a simplified state diagram illustrating how Standby Mode (SM) can be controlled by an application program in an active NFC device.

FIG. 6 illustrates a similar scenario as FIG. 5 where control of PSM 200 is done in the active NFC device 10. In FIG. 6, the curved arrows indicate that after some number of requests, standby mode 220 is entered. For this option, the standby mode can last as long as there are no data to be transferred, either from the second NFC device 10, 20 to the active NFC device 10 or the other way. The second NFC device 10, 20 is kept alive by power harvesting as previously described.

Figure 7:
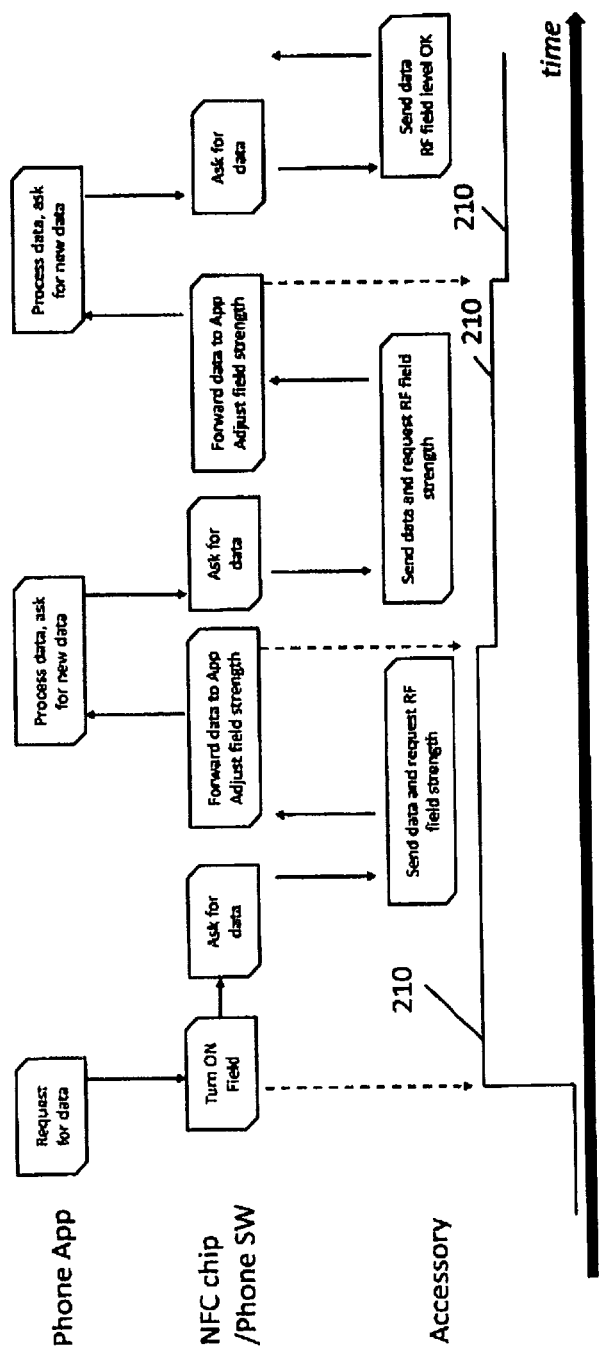
FIG. 7 is an illustration of an example of a second NFC device informing a controlling application program about adjusting the NFC field strength in active data mode.

FIG. 7 illustrates an example of how feedback from the second NFC device 10, 20 can be used to adjust the NFC field strength in order to arrive at a desirable tradeoff between power harvesting in the second NFC device 10, 20, response time for responding to a new request for data and power consumption in the active NFC device 10. The second NFC device 10, 20 informs an application program in the active NFC device 10 to adjust the NFC field strength.

Optionally, as indicated previously, the NFC field can be turned off for a controlled period of time to arrive at a desirable tradeoff between power harvesting in the second NFC device 10, 20, response time for responding to a new request for data and power consumption in the active NFC device 10.

An important property of the present invention is to maintain power in the second NFC device 10, 20 when in connected mode 310 with the first active NFC device 10. This is quite important because the second NFC device 10, 20 is prepared to be powered just via e.g. a capacitor without any primary or secondary battery. This means that harvesting of power from the first active NFC device is the primary or only source of power in the second NFC device 10, 20.

In order to ensure sufficient power, bursts of carrier waves, 'keep alive carrier' (KAC), can optionally be initiated. KAC is not depicted in the drawings. The parameters that define the KAC are:

the field strength of the KAC;
duration of a KAC burst; and
resting period before a KAC burst.

The KAC can optionally be controlled by the first or the second NFC device 10, 20 in order to be able to adapt the KAC to current requirements. Controlling can be adapted to variations of parameters in electronic components and operating environment. Electronic component parameters comprise capacitance and power consumption.

When a sequence of data is transmitted over an NFC link, power harvesting is done with the normal carrier wave. If a carrier wave is not present long enough to ensure power harvesting in the second NFC device 10, 20 is able to supply the second NFC device 10, 20 with sufficient power to stay alive, a KAC burst may be introduced to enable more power. In this way the system of power harvesting can ensure continued operation of the second NFC device 10, 20.

Operations that are done in SW, particularly in high level SW, normally have a relatively long, variable and not controlled duration. When two devices communicate, such as two NFC devices 10, 20, latency has to be included to have reliable communication. The timing operation of KAC can get much improved and made more or less independent on timing of high level SW and is prepared to be performed in a chipset in a device such as a mobile telephone. Because HW in a chipset can be expected to result in much improved timing, latency can be reduced and enough power in the second NFC device is easier to maintain with less redundant power. Controlling the power harvesting to the second NFC device 10, 20 with high level SW will consequently result with less precise, higher latency timing and consequently higher power consumption than necessary.

One particularly relevant way to control the behavior of said chipset regarding KAC is to evaluate the need for power in the second NFC device by high level SW and transfer related parameters to the chipset. This optionally can be updated when in operation. In this way, power harvesting in the second NFC is more reliable, with less redundant power consumption and less dependent on timing in high level SW.

This way of administration of the chipset not only relates to KAC but also to controlling power levels of normal NFC signals.

The invention claimed is:

1. Method for near field communication (NFC) with improved power harvesting, the method enabling Power Save Mode (PSM) in NFC between a first active NFC device and a second NFC device, when the first active NFC device and the second NFC device are in NFC connected mode, characterized by:
the first active NFC device and the second NFC device entering PSM introducing two sub modes in form of time division between two time slots, the PSM comprising:
a first initialization step and thereafter the first active NFC device and the second NFC device concurrently alternating between the following steps:
during a first time slot, data is exchanged between the first active NFC device and the second NFC device, NFC field strength being controlled; and
during a second time slot, the first active NFC device transmitting a standby sequence of NFC waves having lower average power than in the first time slot, the NFC waves comprising at least one of:
lower average field strength than in the first time slot comprising substantially zero field strength; and
non-continuous duration,
while the first active NFC device and the second NFC device remain in the NFC connected mode and the second NFC device harvesting sufficient power from the NFC waves to remain in the NFC connected mode.

2. The method according to claim 1, comprising generating bursts of keep alive carrier (KAC) transmitted from the first active NFC device, the KAC controlled by one or more of the following parameters:
field strength of the KAC;
duration of a KAC burst; and
resting period before a KAC burst.

3. The method according to claim 1, wherein required parameters for power harvesting are calculated in software and afterwards transferred to a chipset for real time NFC operation.

4. The method according to claim 1, where the second NFC device is an accessory NFC device.

5. The method according to claim 1, where PSM is controlled by an application program in the first active NFC device that recognizes that both the first active NFC device and the second NFC device accept transition from the NFC connected mode to sub mode PSM.

6. The method according to claim 1, wherein PSM is controlled by a program in a chipset in the first active NFC device that recognizes that both the first active NFC device and the second NFC device accept transition from the NFC connected mode to sub mode PSM.

7. The method according to claim 1, wherein PSM is controlled by a program in the first active NFC device and initiating PSM by transmitting a request to the second NFC device if it accepts a transition from the NFC connected mode to sub mode PSM.

8. The method according to claim 1, wherein PSM is controlled by the second NFC device and the second NFC device initiates PSM by transmitting, in the NFC connected mode, a request to the first active NFC device if it accepts a transition to sub mode PSM.

9. The method according to claim 1, wherein the controlling the NFC field strength at least partly is based on requirements for at least one of:
i) data rate;
ii) response time of the second NFC device;
iii) reduced power consumption in the first active NFC device; and
iv) power harvesting in the second NFC device.

10. The method according to claim 1, where the first initialization step comprises actively changing an impedance of an antenna of the second NFC device, in order to emulate changing a distance between the first active NFC device and the second NFC device enabling more power for power harvesting in the second NFC device.

11. An NFC system including the first active NFC device and the second NFC device, adapted to implement the method according to claim 1.

12. The NFC system according to claim 11, wherein the first active NFC device is adapted, in the NFC connected mode, to control the NFC field strength at least partly based on requirements for at least one of:
i) data rate;
ii) response time of the second NFC device;
iii) reduced power consumption in the first active NFC device; and
iv) power harvesting in the second NFC device.

13. The NFC system according to claim 11, wherein the first active NFC device is adapted, in the NFC connected mode, to control bursts of keep alive carrier (KAC) at least partly based on requirements for at least one of:
i) reduced power consumption in the first active NFC device; and
ii) power harvesting in the second NFC device.

14. The NFC system device according to claim 11, wherein the second NFC device is adapted, in the NFC connected mode, to control the NFC field strength at least partly based on requirements for at least one of:
i) data rate;
ii) response time of the second NFC device;
iii) reduced power consumption in the first active NFC device; and
iv) power harvesting in the second NFC device.

15. The NFC system according to claim 11, wherein the second NFC device is adapted, in the NFC connected mode, to control bursts of keep alive carrier (KAC) at least partly based on requirements for at least one of:
i) reduced power consumption in the first active NFC device; and
ii) power harvesting in the second NFC device.

* * * * *